United States Patent [19]

Larsen

[11] 3,770,055

[45] *Nov. 6, 1973

[54] FILM FORMING HYDRAZINE-CONTAINING CORROSION INHIBITOR

[75] Inventor: Arthur Lee Larsen, Denver, Colo.

[73] Assignee: Marathon Oil Company, Findlay, Ohio

[ * ] Notice: The portion of the term of this patent subsequent to Feb. 28, 1989, has been disclaimed.

[22] Filed: Oct. 29, 1971

[21] Appl. No.: 194,009

Related U.S. Application Data

[63] Continuation-in-part of Ser. No. 790,485, Jan. 10, 1969, Pat. No. 3,645,896.

[52] U.S. Cl.............. 166/244 C, 21/2.7, 166/275, 166/305 R, 166/310, 252/8.55 D, 252/8.55 E, 252/390, 252/392
[51] Int. Cl...................... C23f 11/14, C23f 11/08
[58] Field of Search.................. 252/8.55 D, 8.55 E, 252/390, 392; 21/2.5, 2.7; 166/275, 244 C, 305 R

[56] References Cited
UNITED STATES PATENTS

| | | | |
|---|---|---|---|
| 3,551,349 | 12/1970 | Kallfass | 252/392 |
| 3,119,447 | 1/1964 | Raifsnider et al. | 252/8.55 X |
| 3,200,071 | 8/1965 | Stromberg | 252/8.55 |
| 3,106,525 | 10/1963 | Schmid et al. | 252/8.55 X |
| 3,645,896 | 2/1972 | Larsen | 252/8.55 |
| 2,468,163 | 4/1949 | Blair et al. | 252/8.55 |
| 3,445,441 | 5/1969 | Rushton | 252/8.55 |

FOREIGN PATENTS OR APPLICATIONS 659,624   3/1963   Canada.............................. 252/8.5

OTHER PUBLICATIONS

Sanvely et al., Corrosion, Vol. 25, No. 10, October 1969, pages 397–404.
Baker et al., Hydrazine as an Oxygen Scavenger, Transactions of the ASME, Feb. 1956, pages 299 to 303.
Encyclopedia of Chemical Technology, Second Edition, Vol. 6, Pub. 1953 by Interscience Publishers of New York, pages 330 to 333.

*Primary Examiner*—Herbert B. Guynn
*Attorney*—Joseph C. Herring et al.

[57] ABSTRACT

Corrosion rates in oil wells are reduced by injecting the combination of about 2–200 ppm. of a film-forming nitrogen-containing corrosion inhibitor (e.g. an imidazoline compound) and about 0.01–1.0 ppm. of residual hydrazine, the ppm. based on water either produced or injected through the well, e.g. water produced in a gas lift well or water injected into an injection well. Such is especially useful with water injection wells, gas lift wells, etc.

9 Claims, No Drawings

FILM FORMING HYDRAZINE-CONTAINING CORROSION INHIBITOR

CROSS REFERENCE TO RELATED APPLICATIONS

This is a continuation-in-part of my copending application Ser. No. 790,485, filed Jan. 10, 1969, now U.S. Pat. No. 3,645,896.

BACKGROUND OF THE INVENTION

1. Field of the Invention

This invention relates to inhibiting corrosion of oil wells, especially water-injection wells, gas lift wells, and wells producing water, piping (conduit) systems associated with wells, systems for containing oil and/or water (identified as gathering systems), oil well equipment, etc. The corrosion inhibitor can be injected upstream of the well, at the well head, downhole, or other suitable places.

2. Prior Art to the Invention

The Encyclopedia of Chemical Technology, Second Edition, Volume 6, pages 330–340 teaches that acid neutralizing-type inhibitors and film-forming organic-type inhibitors are useful as corrosion inhibitors. It teaches that hydrazine is known to be an effective acid neutralizing inhibitor, especially when dissolved gases, such as $O_2$, $CO_2$ and $H_2S$ are present in waterflooding systems; however, for hydrazine to react with $O_2$, the temperature of the system must be relatively high. As far as film-forming organic-type inhibitors, it teaches that fatty and heterocyclic nitrogen-containing compounds, such as the amine-acid complexes and the imidazoline derivatives, are useful.

Raifsnider et al. (U.S. Pat. No. 3,119,447) teaches inhibiting corrosion of water-injection wells by injecting 10–100 ppm. of imidazoline and 5–150 ppm. of sulfite ion in the presence of a catalyst. The catalyst is necessary to activate or catalyze the sulfite ion reaction with oxygen. The catalyst can normally be within briny water. The catalyzed $Na_2SO_3$ must be added before the imidazoline, otherwise the imidazoline complexes the catalyst thereby inhibiting oxygen removal.

Stromberg (U.S. Pat. No. 3,200,071) teaches inhibiting corrosion of ferrous metals by injecting into the well 5–10,000 ppm. of a composition composed of:

1. an hydroxy aliphatic cyclic amidine,
2. a cyclo aliphatic amine, and
3. an aryl sulfonic acid.

Schmid (U.S. Pat. No. 3,106,525) teaches incorporating reducing agents into waters that are injected into geological formations, the effect being to prevent corrosion and to solubilize iron oxides. Examples of reducing agents are sulfur-containing compounds such as dithionites, sulfinic acid, sulfinates, or compounds containing the sulfinic acid or sulfoxylate group. Carbon dioxide is added to the aqueous solution containing the reducing agents to adjust the pH to 5–6.

Snavely et al in their article titled "Rates of Reaction of Dissolved Oxygen with Scavengers in Sweet and Sour Brines" Corrosion, Volume 25, No. 10, Oct., 1969, pages 397–404, disclose sodium sulfite is a useful oxygen scavenger in wells. They state that hydrazine is not used as an oxygen scavenger since at ambient temperatures it reacts too slowly with the oxygen. Also, they emphasize that a catalyst is needed with sodium sulfite to facilitate the reaction with oxygen.

The average temperature of water in water injection wells in the United States is about 100° to 130°. In a gas lift well, the average temperature in the United States is about 110° – 135°F. These temperatures are below the temperature at which hydrazine will react at a normally acceptable rate with oxygen.

It is generally known that film-forming, nitrogen-containing corrosion inhibitors will not function effectively in the presence of oxygen. Also, it is known that the cost of removing relatively large amounts of oxygen with hydrazine can be prohibitive.

SUMMARY OF THE INVENTION

Applicant has discovered that corrosion in a well bore can be reduced by injecting a combination of a sufficient amount of hydrazine to maintain a residual hydrazine concentration of about 0.01 to about 1.0 ppm. and about 2 to about 200 ppm. of a film-forming nitrogen-containing corrosion inhibitor. The term "residual" means that amount of hydrazine which can be analyzed as free hydrazine—it is postulated that some of the hydrazine may act as a sacrificial anode, the anodic reaction being:

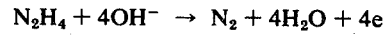
$$N_2H_4 + 4OH^- \rightarrow N_2 + 4H_2O + 4e$$

The term "residual hydrazine" does not mean that amount of hydrazine in excess of the reaction to neutralize all of the $O_2$, i.e. that in excess of the reaction:

$$N_2H_4 + O_2 \rightarrow N_2 + 4H_2O.$$

The combination of the hydrazine and the corrosion inhibitor imparts a synergistic action, such is illustrated in the tests of Example I.

DESCRIPTION OF THE INVENTION

A combination of about 2 to about 200 ppm. and preferably about 10 to about 20 ppm. of the film-forming nitrogen-containing corrosion inhibitor and about 0.01 to about 1.0 ppm., preferably about 0.1 to about 0.5 ppm. of residual hydrazine is useful to give good corrosion protection with this invention. Amounts in excess of 1 ppm. of hydrazine are useful, but such concentrations generally prove to be too costly for the results obtained. The concentrations of hydrazine are substantially less than the molecular equivalent of the oxygen generally present in the corroding medium. Too much of the film-forming nitrogen-containing corrosion inhibitor may cause a formation emulsion, therefore such large amounts are undesirable.

The film-forming nitrogen-containing corrosion inhibitor can be a primary amine, a secondary amine, a tertiary amine, a quaternary amine, a diamine, salts of these amines or corrosion inhibitors of like character. The salts of the amines are preferably those having water dispersible characteristics e.g. ethylene oxide, or low molecular weight carboxylic acid condensates with the amine compound. Where the corroding medium contains substantial amounts of hydrocarbon, the dispersible characteristics of the salts can be more oleophilic.

Examples of nitrogen-containing corrosion inhibitors include the alkyl quaternary ammonium salts and dialkyl quaternary ammonium salts and mixtures of the same. The salts, for example the chlorides, can be identified by the formula:

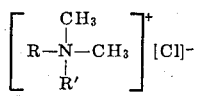

wherein R is alkyl containing 5–25 and preferably 8–18 carbon atoms and R' is alkyl containing 1 or 5–25 and preferably 8–18 carbon atoms. Specific examples of the alkyl quaternary ammonium chlorides include Arquad-C, Arquad-S and Arquad-T (Arquad is a trademark of Armour Industrial Chemical Co., 110 No. Wacker Dr., Chicago 6, Illinois). Examples of the dialkyl quaternary ammonium chlorides include Arquad-2C-50, Arquad 2C-75 and Arquad 2S-75 and mixtures of the monoalkyl and dialkyl quaternary ammonium chlorides, e.g. Arquad T-2C and Arquad S-2C.

Also useful are tertiary amines identified by the formula:

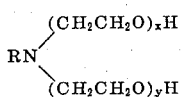

wherein R is alkyl and contains 10–20 and preferably 12–18 carbon atoms, x and y are positive integers within the range of 2 to 15. Specific examples of useful tertiary amines are the Ethomeens (a trademark of Armour Industrial Chemical Co.) and specifically Ethomeen S/20.

Also useful with the invention are the diamines and specifically those identified by the formula:

wherein $R_1$ is alkyl containing 8–20, preferably 10–18 and more preferably 12–14 carbon atoms and R is alkyl containing 2–4 and preferably 3 carbon atoms. Specific examples of useful diamines include Duomeen C (Duomeen is a trademark of Armour Industrial Chemical Co.)

A particularly useful film-forming nitrogen-containing compound is the imidazoline compound identified as:

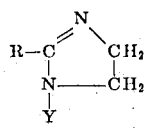

wherein R is alkyl containing an average of about 10 to about 20 carbon atoms and Y is H, a hydroxy alkyl substituent containing up to about 8 carbon atoms (e.g. $C_2H_4OH$), an alkyl amine-containing substituent containing up to about 8 carbon atoms, e.g. $C_2H_4NH_2$. The salts of the imidazoline are preferred with this invention. Such salts are the reaction of the above-identified imidazoline compound with hydrochloric acid or an organic acid containing 1–14 carbon atoms, specific examples include carbonic acid, acetic acid, adipic acid, naphthenic acid. Particularly useful imidazoline containing compounds include Corban 210 WS (acetic salt of imidazoline, contains about 22–28 percent imidazoline, about 3–5 percent of acetic acid, about 1 percent of a dispersant and the balance isopropanol and water), and Corban 222, tradename of Dowell, a division of Dow Chemical Company, Tulsa, Okla.

The nitrogen-containing corrosion inhibitor can be a mixture comprised of a dispersing agent, a wetting agent, a solvent (e.g. alcohol and/or water), etc. Examples of dispersants and wetting agents include the nonionic surfactants such as alkyl phenols wherein the alkyl contains 6–12 and preferably 8–9 carbon atoms, optionally the alkyl can be ethoxylated (e.g. contains 1–10 and preferably 2–4 moles of ethylene oxide). Such additives are useful to improve the water solubility or dispersibility of the nitrogen-containing corrosion inhibitor. Other additives which impart desired characteristics to the handling of the chemical, the application of the chemical in the particular well, etc. may be used along with the inhibitor and hydrazine.

It is preferred that the hydrazine be available in a safe condition, i.e. diluted with water; while the anhydrous form is useful, hydrous solutions of hydrazine are recommended.

The film-forming nitrogen-containing corrosion inhibitor and the hydrazine necessarily do not react. The combination however, produces a synergistic effect which reduces the amount of corrosion in the well bore or on the metal surface. Such a combination is particularly useful with a water injection well (i.e. where waterflooding process is being effected), a gas lift well (the corrosion inhibitor is injected into the gas at the well head or can be injected downhole), etc. to materially reduce corrosion in well bore casings, tubing, distribution lines, systems to contain crude oil, water or gas, etc.

The hydrazine and the film-forming nitrogen containing corrosion inhibitor may be injected separately or simultaneously, injected as a composition inhibitor, or by any other means known in the art. If the hydrazine is to be stored, it is recommended that it be diluted with water and the water be free of cations which will catalyze the oxidation of hydrazine. Also, it is recommended that deionized water, a water soluble organic solvent (e.g. isopropanol) or a low molecular weight hydrocarbon (including kerosene) or combination of the above be used to dilute the film-forming nitrogen-containing corrosion inhibitor, if the latter is to be diluted.

The combination of hydrazine and the film-forming nitrogen-containing corrosion inhibitor can be injected with soft water, brine or brackish water, liquid or gaseous hydrocarbon, etc., into the well.

The concentration of hydrazine and the nitrogen-containing corrosion inhibitor are based on the water produced from the well or water injected into the well. For example, with a gas lift well, the inhibitor and hydrazine are based on water produced from the well.

In some cases, corrosion rates can be misleading and in the case of an oxidizing atmosphere, pitting can result to give a severe condition even though the corrosion rate, e.g. less than 20 mills per year, indicates that such a condition does not exist. For example, where pitting occurs, the corrosion can be in excess of 400 mills per year in the pit. By following the teachings of this invention, corrosion can be controlled down to less than 1 mill per year; also, the pitting effect can be substantially reduced or eliminated.

The following examples are presented to illustrate specific working embodiments of the invention. Unless otherwise specified, all percents are based on volume. The corrosion rates in the water injection wells are measured with a Pair Corrosion Meter, marketed by Petrolite Corp., St. Louis, Mo. The average temperature of water within the water injection wells in all three cases of Example I is about 80°F. In Example II, the corrosion rates in the gas lift wells were determined using a Corrosometer instrument, manufactured by Magna Corp., Santa Fe Springs, California. The average temperature of water in the gas injection wells is about 130°F.

EXAMPLE I

The following tests illustrate the synergistic effect of the hydrazine and the film-forming nitrogen-containing corrosion inhibitor:

Test 1: A water injection well having 1–2 ppm. of dissolved oxygen in the injected water (about 300 barrels/day) is treated with an imidazoline composition (Corban 210 WS) at a concentration of 200 ppm. (the concentration of imidazoline based on the injection water) over a period of one month. At the end of the test period, the well indicated a corrosion rate of about 20 mills per year.

Test 2: The water injection well of Test 1 is treated with only hydrazine in the water at a residual concentration of 0.3 ppm. of hydrazine for 1 month, the ppm. based on the injected water. At the end of the test period, the well indicated a corrosion rate of about 14 mills per year.

Test 3: The water injection well of Test 1 is treated with 0.3 ppm. of residual hydrazine and about 10 ppm. (based on imidazoline) of an imidazoline compound (Corban 210 WS) over a period of 1 month, the ppm. based on injected water. At the end of the test period, the well indicated a corrosion rate of about 4 mills per year.

Test 3 indicates that a synergistic effect of the hydrazine and the film-forming nitrogen containing corrosion inhibitor gives a reduction in corrosion rate of 4 mills per year whereas the use of hydrazine alone gave a corrosion rate of 14 mills per year and the film-forming nitrogen-containing corrosion inhibitor gave a corrosion rate of 20 mills per year.

EXAMPLE II

This example concerns gas lift wells. The chemicals were injected upstream of the well in a common gas distribution line. The gas feeds into a series of wells to accomplish lifting the crude oil from the reservoir by a gas lift method. In this example, one common well was used for the test purpose and it was located about one-half mile downstream from where the chemicals were injected into the conduit containing dry gas. The average temperature of the water within the gas lift well is 130°F. To make a comparative study, a combination of sodium hydrosulfite and nitrogen-containing corrosion inhibitor were injected and evaluated and thereafter a combination of hydrazine and the same nitrogen-containing corrosion inhibitor were injected and compared with the previous combination.

Test 1: Based on the total water produced at the well head, 0.9 ppm. of sodium hydrosulfite and 3 ppm. of a nitrogen-containing corrosion inhibitor (composed of 25 percent by weight of Ethomeen S/20, 50 percent by weight of Arquad S and 25 percent of nonylphenol containing 9 moles of ethylene oxide attached to the nonyl grouping) were injected into the dry gas. The chemicals were injected in an alcohol and water solution to make sure they were evenly distributed into the dry gas. Thereafter, the corrosion rate was measured and it was found to be in excess of 7.0 mills per year.

Test 2: In the same well, there was injected 0.9 ppm. of hydrazine, 3 ppm. of the same nitrogen-containing corrosion inhibitor. The corrosion rate was measured and it was found to be less than 0.4 mills per year; a constant check on the corrosion rate for 18 months indicated this same corrosion rate.

Test 2 compared to Test 1 indicates the composition of applicant's invention is superior to that suggested by the art.

Additives known in the art can be added to the film-forming nitrogen containing corrosion inhibitor and hydrazine. Examples of such additives include dispersants, bacteriostats, corrosion inhibitors, emulsion breakers, etc.

This example is not meant to limit the invention in any way. Rather, all equivalents obvious to those skilled in the art are intended to be included within the scope of the invention as defined within the specification and appended claims.

What is claimed is:

1. A method of reducing the corrosion in a well and associated conduits and gathering systems wherein water is either produced or injected and the average temperature of the water is up to about 135°F., the method comprising injecting into the well about 0.01 to about 1.0 ppm. of residual hydrazine and about 2 to about 200 ppm. of a film-forming nitrogen-containing corrosion inhibitor selected from the group:

a. a salt obtained by reacting an imidazoline compound identified by the formula:

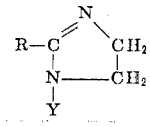

wherein R is alkyl containing an average of about 10 to about 20 carbon atoms and Y is H, a hydroxy alkyl substituent containing up to about 8 carbon atoms or an amino-alkyl containing up to about 8 carbon atoms, with hydrochloric acid or an organic carboxylic acid containing 1 to about 14 carbon atoms, b. a quaternary ammonium salt identified by the formula:

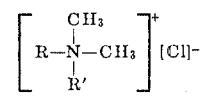

wherein R is alkyl containing about 5 to about 25 carbon atoms and R is methyl or alkyl containing about 5 to about 25 carbon atoms, c. a tertiary amine identified by the formula:

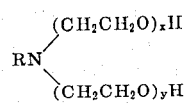

wherein R is alkyl containing about 10 to about 20 carbon atoms, $x$ and $y$ are positive integers within the range of about 2 to about 15, and d. a diamine identified by the formula:

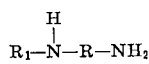

wherein R is alkylene containing about 2 to about 4 carbon atoms and $R_1$ is alkyl containing about 8 to about 20 carbon atoms, or e. a combination of two or more of (a), (b), (c), and (d), the ppm based on the water and the injected hydrazine being less than the molecular equivalent of oxygen present in the water.

2. The process of claim 1 wherein about 0.1 to about 0.5 ppm. of residual hydrazine is injected into the well.

3. The process of claim 1 wherein about 10 to about 20 ppm. of the film-forming nitrogen-containing corrosion inhibitor is injected into the well.

4. The process of claim 1 wherein the well is a gas lift well.

5. The process of claim 1 wherein the well is a water injection well.

6. A method of reducing the corrosion rate in a well and associated conduits and gathering systems wherein water is either produced or injected and the average temperature of the water is up to about 135°F., the method comprising injecting into the well about 0.01 to about 1.0 ppm of residual hydrazine and about 2 to about 200 ppm of a salt obtained by reacting:

1. an imidazoline compound identified by the formula:

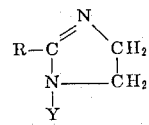

wherein R is alkyl containing an average of about 10 to about 20 carbon atoms and Y is H, a hydroxy alkyl substituent containing up to about 8 carbon atoms, an amino-alkyl containing up to about 8 carbon atoms, and 2. an acid selected from the group consisting of hydrochloric acid and an organic carboxylic acid containing 1 to about 14 carbon atoms, the ppm based on the water and the amount of injected hydrazine being less than the molecular equivalent of oxygen present in the water.

7. The process of claim 6 wherein the acid is acetic acid.

8. The process of claim 1 wherein the well is a gas lift well.

9. The process of claim 1 wherein the well is a water injection well.

* * * * *

PO-1050
(5/69)

UNITED STATES PATENT OFFICE
CERTIFICATE OF CORRECTION

Patent No. 3,770,055          Dated November 6, 1973

Inventor(s) Arthur Lee Larsen

It is certified that error appears in the above-identified patent and that said Letters Patent are hereby corrected as shown below:

Column 7,
  Claim 1, line 2:          After "R" insert --'--.

Signed and sealed this 23rd day of April 1974.

(SEAL)
Attest:

EDWARD M.FLETCHER,JR.          C. MARSHALL DANN
Attesting Officer              Commissioner of Patents